United States Patent [19]

Kato et al.

[11] Patent Number: 4,881,173

[45] Date of Patent: Nov. 14, 1989

[54] ELECTRONICALLY CONTROLLED AUTOMATIC SPEED CHANGING APPARATUS

[75] Inventors: Takeo Kato; Shingo Kobayashi; Kazuo Takagi, all of Hiratsuka; Masahiro Watanabe, Yokohama; Kiyoshi Kaneko, Kawasaki, all of Japan

[73] Assignee: Kabushiki Kaisha Komatsu Seisakusho, Tokyo, Japan

[21] Appl. No.: 901,148

[22] Filed: Aug. 28, 1986

[30] Foreign Application Priority Data

Sep. 6, 1985 [JP] Japan ................................ 60-197244

[51] Int. Cl.⁴ ...................... B60K 41/08; G06F 15/20
[52] U.S. Cl. ............................ 364/431.07; 364/424.1; 74/866
[58] Field of Search ................. 364/431.07, 424, 565, 364/426, 424.05, 424.1; 74/866; 123/350

[56]  References Cited

U.S. PATENT DOCUMENTS

| 4,495,576 | 1/1985 | Ito ..................................... 364/424.1 |
| 4,658,676 | 4/1987 | Furusawa et al. ..................... 74/866 |
| 4,691,285 | 9/1987 | Takeda ............................... 364/424.1 |
| 4,739,856 | 4/1988 | Inagaki et al. ....................... 364/426 |

FOREIGN PATENT DOCUMENTS 0070323  4/1983  Japan .............................. 364/431.07
874402  10/1981  U.S.S.R. .

Primary Examiner—Parshotam S. Lall
Assistant Examiner—Ellis B. Ramirez
Attorney, Agent, or Firm—Diller, Ramik & Wight

[57]  ABSTRACT

A desired speed stage is preselected and at a time when a car speed reaches a speed commensurate with the preselected speed stage, a present speed stage is changed to the preselected speed stage.

6 Claims, 5 Drawing Sheets

ELECTRONICALLY CONTROLLED AUTOMATIC SPEED CHANGING APPARATUS

BACKGROUND OF THE INVENTION

1. Field of the Invention

This invention relates to an electronically controlled automatic speed changing apparatus capable of skip speed changing.

2. Description of the Prior Art

Prior art electronically controlled speed changing apparatus of the type referred to above is constructed such that the speed is changed stepwisely in the shift-up direction or shift-down direction by operating a speed changing clutch mechanism for changing meshing of gears.

Such speed changing clutch mechanism, however, requires a certain time until it is completely engaged due to a time for filling pressurized oil in a clutch chamber and due to an oil pressure modulation (a modulation necessary for gradually changing oil pressure), etc. For this reason, it has been the practice to set a definite time (called a speed change inhibition time) necessary to complete the clutch engagement as a speed changing time for inhibitting the speed change to a next stage until this time has elapsed.

Where the automatic speed changing apparatus is operated in the shift-down direction when a car running at a high speed reaches a steep slope, the prior art speed changing apparatus has the following defects.

More particularly, since the driving torque of the car becomes zero before the speed changing clutch mechanism actually engages so that the car speed decreases during this interval. Accordingly, when the car reaches the steep slope while it is running at the 7th speed, the car speed would change stepwisely, that is, 7th speed→6th speed→fifth speed→fourth speed. This not only decreases the operating life of the elements constituting a power line but also gives to an operator uncomfortable feeling caused by shocks due to speed changing.

SUMMARY OF THE INVENTION

Accordingly, it is an object of this invention to provide an improved electronically controlled speed changing apparatus capable of automatically changing a present speed stage to a preselected speed stage, that is, precontracted speed stage.

According to this invention, there is provided electronically controlled automatic speed changing apparatus comprising speed stage designating means for designating a speed stage to be preselected; speed stage preselecting means for preselecting the speed stage designated by the speed stage designating means; car speed detecting means for detecting a car speed; and speed stage changing means for changing a present speed stage to the preselected speed stage when a car speed detected by the car speed detecting means reaches a car speed commensurate with a speed stage preselected by the speed stage preselecting means.

According to a modified embodiment of this invention, there is provided electronically controlled automatic speed changing apparatus comprising speed stage designating means for designating a speed stage to be preselected; means for judging whether preselection of the speed stage is possible or not; speed stage preselecting means for preselecting the speed stage when the judging means judges that preselection of the speed stage is possible; means for detecting a car speed; speed stage changing means for changing a present speed stage to the preselected speed stage when a car speed detected by the car speed detecting means reaches a speed commensurate with the speed stage preselected by the speed stage preselecting means; and automatic speed change processing means for executing normal automatic speed change at a first speed change stage when the judging means judges that the preselection of the speed stage is impossible.

DESCRIPTION OF THE PREFERRED EMBODIMENT

Figure 1:
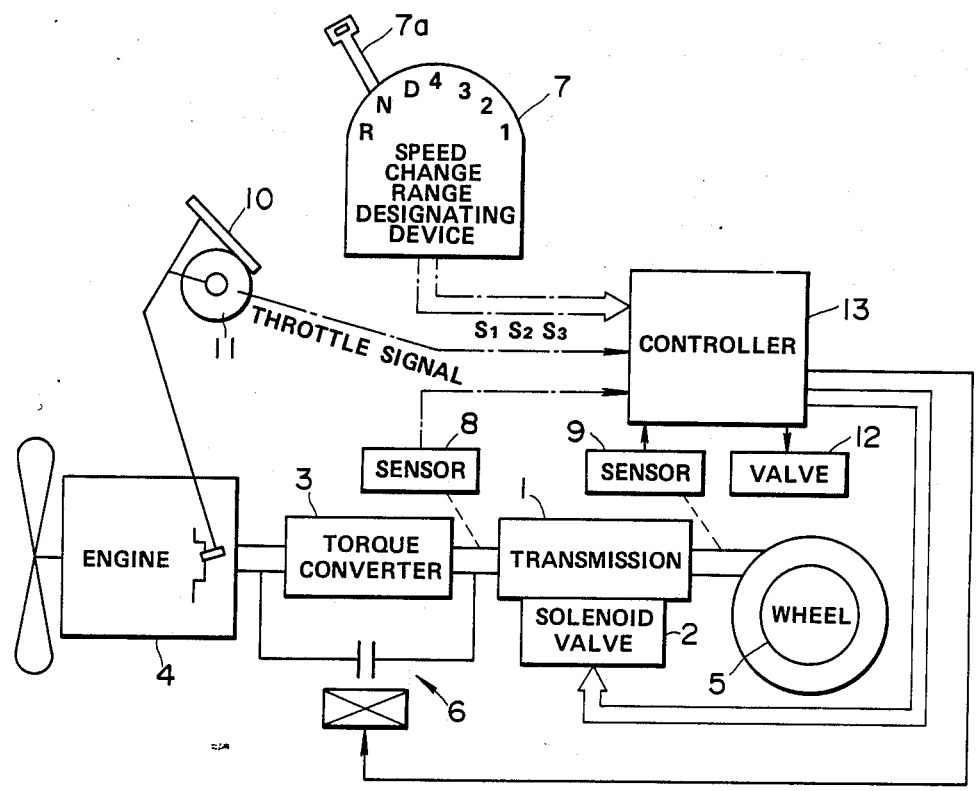
FIG. 1 is a block diagram showing one embodiment of the automatic speed changing apparatus according to this invention.

FIG. 1 shows an embodiment of the invention applicable to dump cars, trucks and the like. A transmission mechanism 1 contains a plurality of oil pressure type speed changing clutches, not shown, for selecting speed stages. The clutches are selectively operated by a solenoid valve 2 for selecting the speed stages of the transmission mechanism.

To the input shaft of the transmission mechanism 1 is applied the output of an internal combustion engine 4 through a torque converter 3, and the output of the transmission mechanism 1 is transmitted to driving wheels 5.

An electromagnetic type lock-up clutch is connected between the input and output shaft of the torque converter 3 so that when the lock-up clutch 3 is operated, the input and output shafts of the torque converter 3 and directly coupled together.

Figure 3:
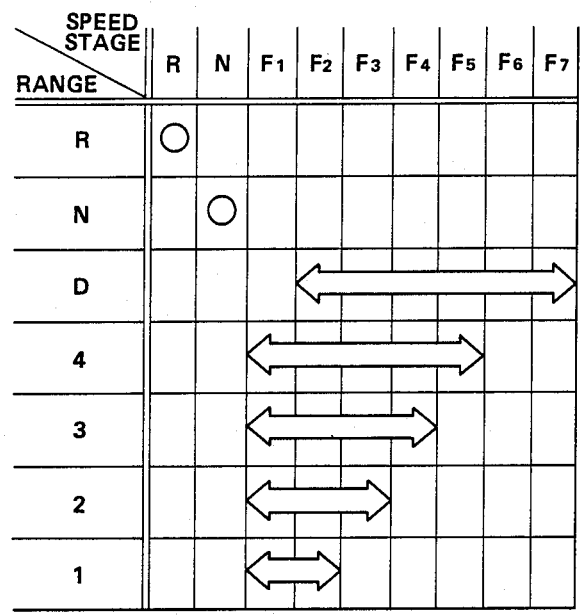
FIG. 3 is a graph showing speed stages contained in individual speed change ranges.

A speed change range designating device 7 is provided for designating speed change ranges R, N, D, 4, 3, 2 and 1 shown in FIG. 3 when its lever 7a is operated for producing signals corresponding to designated ranges.

A rotation sensor 8 produces a signal representing the number of revolutions of the output shaft of the torque converter 3 (the number of revolutions of the input shaft of the transmission mechanism 1), while another rotating sensor 9 produces a signal showing the number of revolutions of the output shaft of the transmission mechanism 4.

Figure 2:
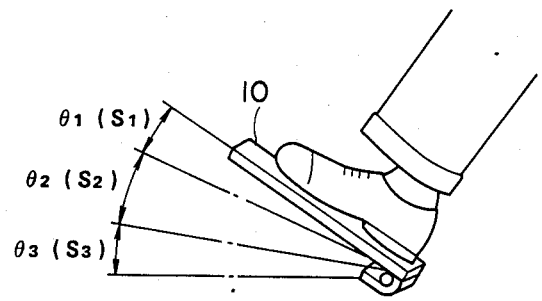
FIG. 2 is a diagram showing a range of the operating angle of a throttle pedal.

A throttle sensor 11 attached with a throttle pedal 10 produces throttle signals $S_1$, $S_2$ and $S_3$ when the pedal 10 lies in operating angle ranges $\theta_1$, $\theta_2$ and $\theta_3$ shown in FIG. 2.

A retarder valve 12 is provided for supplying pressurized oil to a retarding a brake, not shown. The retarder valve 12 operates when the number of revolutions of the output shaft of the torque converter exceeds a predetermined number for actuating the retarding brake.

Figure 5A:
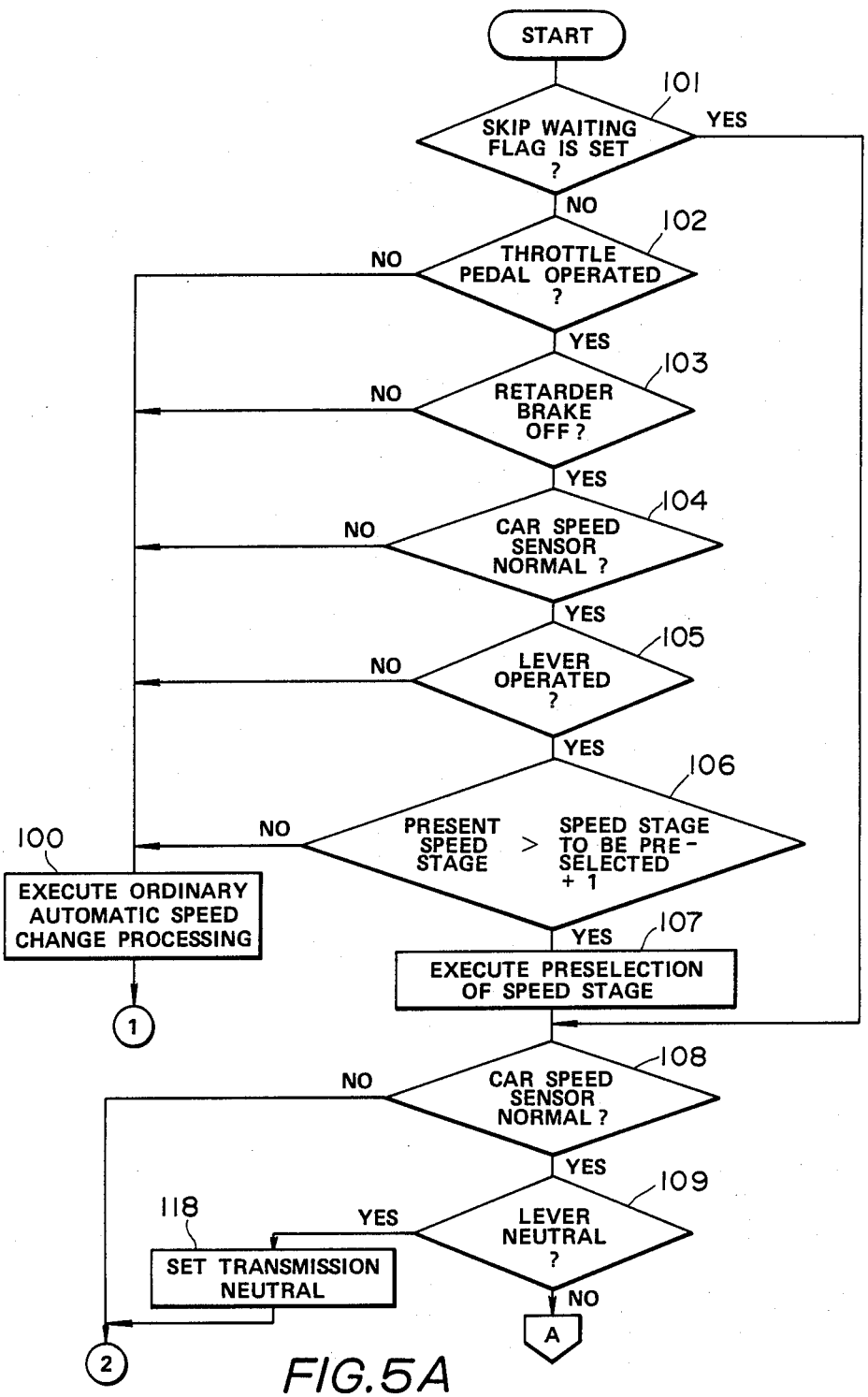
FIG. 5A & 5B are flow charts showing the processing steps of the controller shown in FIG. 1.
Figure 5B:
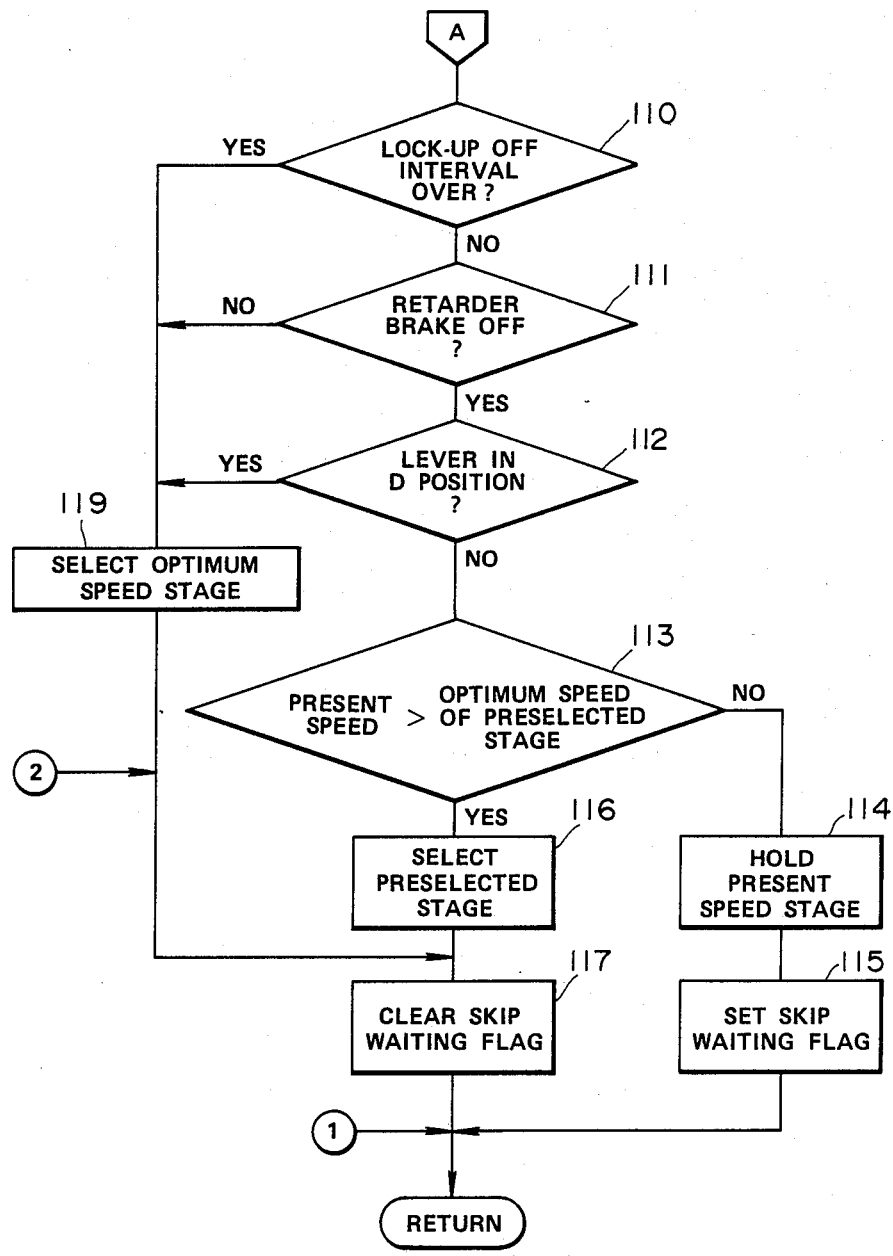

The controller 13 executes program steps shown in FIG. 5 in accordance with the outputs of the speed change range designating device 7, rotation sensors 8 and 9 and the throttle sensor 11. The operation of this embodiment will be described with reference to this flow chart.

Figure 4:
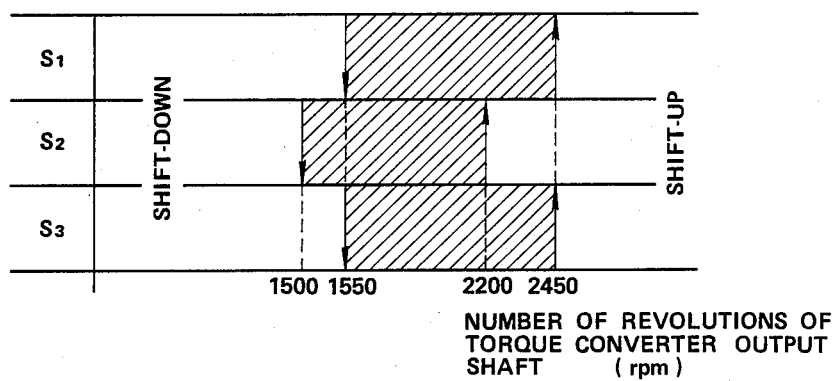
FIG. 4 shows one example of a speed change judging pattern utilized for conventional automatic speed change.

At step 100, an ordinary automatic speed change processing is executed. At this step, a judgment is made as to whether the speed should be changed or not based on the speed change pattern illustrated in FIG. 4. More particularly, when a signal $S_1$ is outputted from throttle sensor 11, a shift-down is judged when the number of revolutions of the output shaft of the torque converter 3 detected by rotating sensor 8 decreases below 1550 r.p.m., whereas a shift-up is judged when the number of revolutions exceeds 2450 r.p.m.

Assume now that the present speed stage is F3, when the shift-down is judged, a signal selecting a speed stage F2 is sent to solenoid valve 2 from controller 13 whereby the speed change clutch contained in the transmission mechanism 1 is operated so as to change the speed stage from F3 to F2. On the other hand, when the shift-up is judged, the speed change clutch is operated in the same manner for changing the speed stage from F3 to F4.

When the speed range designating device 7 designates a D range, for example, as shown in FIG. 3, based on the speed change pattern described above, an automatic speed change (shift-up, shift-down) in ranges F2-F7 is executed. Where ranges 4, 3, 2 and 1 are designated, the automatic speed change is executed in ranges F1-F5, F1-F4, F1-F3 and F1-F2, respectively. Accordingly, at the time of an ordinary automatic speed change, the range designating device 7 designates the D range, and when the car running at the speed stage 7 reaches a steep slope, the shift-down is done stepwisely as F7→F6→F5→---.

A skip speed change processing (jumping speed change) at the time of climbing a slope will be described as follows. This skip speed change processing is executed in such a case when a car running at the speed range F7, for example, reaches a steep slope, and where the operator preselects a speed stage F2 as a speed stage suitable for the slope, the speed is jumped from stage F7 to F2 when the car speed reached a value commensurate with the speed stage F2.

In the flow chart shown in FIG. 5, at step 101, a judgment is made as to whether a skip waiting flag to be described later has been set or not. When the flag was not set, at step 102, a judgment is made as to whether the throttle pedal 10 has been operated or not by the operation of a limit switch, not shown, provided for the throttle pedal 10. As the car reaches a slope, the throttle pedal 10 is always depressed so that the result of judgment at this step 102 would be YES.

When the result of judgment executed at step 102 is YES, at step 103, a judgment is made as to whether a retarder brake, not shown, is OFF or not in accordance with an output of a pressure switch, not shown, associated with the retarder brake. As is well known in the art, since the retarder brake is operated when the car descends a slope, the result YES of the judgment executed at step 103 means that the car is not descending the slope.

When the result of judgment at step 103 is YES, at step 104, a judgment is made as to whether the car speed sensor is normal or not. The car speed sensor utilized in step 104 means the rotation sensor 9 because the number of revolutions of the output shaft of the transmission mechanism 1 represents the car speed. As will be described later, the timing of the skip speed change depends on the car speed so that when the rotation sensor 9 is abnormal, the optimum skip speed change is impossible.

A method of detecting an abnormal condition of the car speed sensor will be described in the following.

Among the abnormal conditions of the car speed sensor 9, such abnormal condition in which the output of the sensor becomes zero, for example breakage of a wiring, can be detected relatively readily. However, a method capable of readily and accurately detecting such abnormals as the decrease in the output of the sensor 9 and the decrease in the number of outputs has not yet been proposed.

Figure 6:
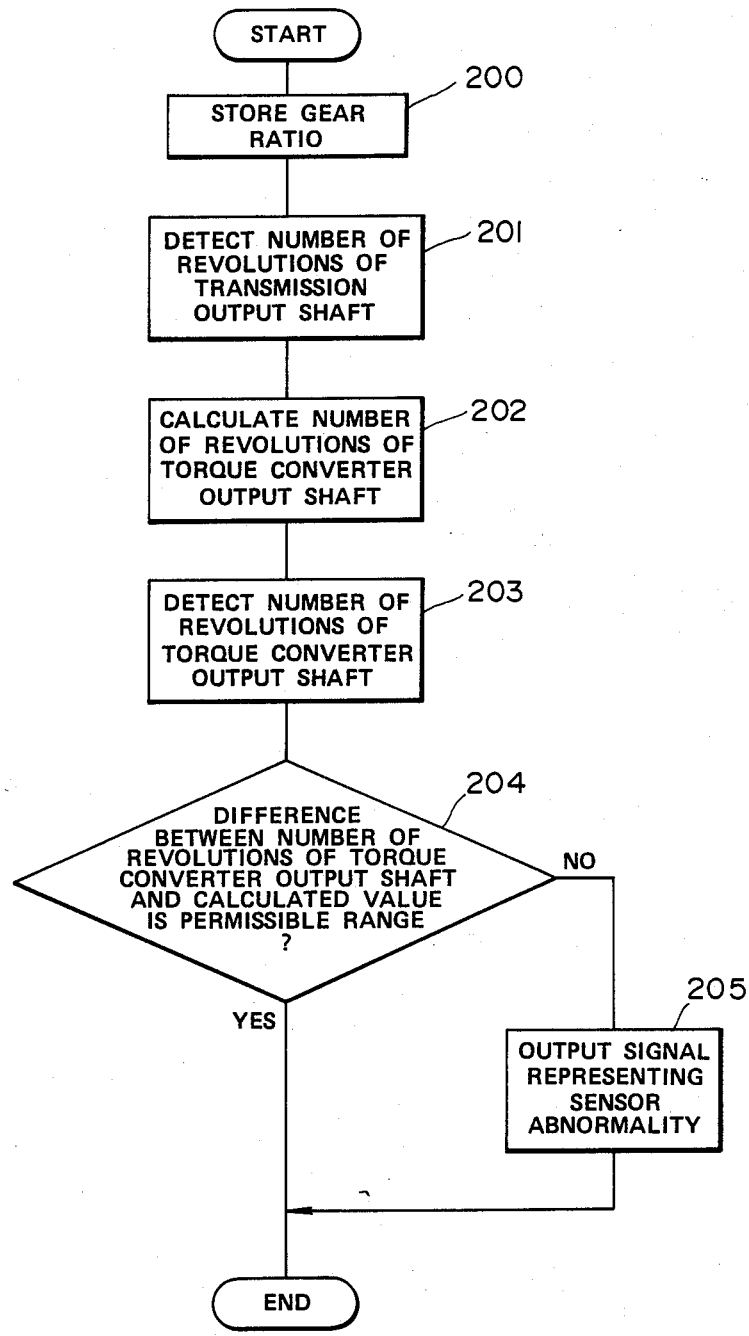
FIG. 6 is a flow chart showing the processing steps for detecting an abnormal condition of a car speed detector.

FIG. 6 is a flow chart showing the steps of procedures capable of accurately detecting the latter abnormal conditions. These procedures are executed by controller 13 described above.

According to these procedures, at step 200, the gear ratio of the transmission mechanism is stored in a memory device of the controller 13 based on the present speed. Then, at step 201, the member of revolutions of the output shaft of the transmission mechanism 1 is detected in accordance with the output of sensor 9.

When the gear ratio and the number of revolutions of the output shaft of the transmission mechanism are known, the number of revolutions of the input shaft of the transmission mechanism can be calculated according to these known values. Thus, at the next step 202, the number of revolutions of the input shaft is calculated using the following equation.

Calculated value=(gear ratio)×(number of revolution of the output shaft of the transmission mechanism)

Then at step 203, the number of revolutions of the output shaft of the torque converter is detected based on the output of sensor 8. After that, at step 204, a judgment is made as to whether the difference between the number of revolutions of the output shaft of the torque converter and the calculated value (this difference representing the actual number of revolutions of the input shaft of the transmission mechanism 1) is included in a permissible range or not. When the result of this judgment is NO, a signal showing the abnormal condition of the sensor 9 is outputted at step 205. When this signal is outputted, the result of judgment at step 104 becomes NO.

In the foregoing procedures, the abnormal condition of the sensor 9 is detected on the assumption that the opertion of the sensor 8 is normal. This does not present any practical trouble because it is extremely rare that both sensors 8 and 9 become abnormal at the same time.

With the procedures described above, the abnormal condition of the transmission mechanism 1 can be detected on the assumption that both sensors operate normally.

Where the skip speed change is made from speed step F7 to speed step F2, for example, it is necessary for the operator to present the speed stage F2. In this embodiment, the sped change range designating device 7 is used as the means for indicating the speed stage to be preselected. More particularly, in this embodiment, as the lever 7a of the designating device 7 is moved to positions 4, 3, 2 and 1 respectively, it is judged that speed stages F5, F4, F3 and F2 are designated as the speed stages to be preselected.

The lever operation of the speed change range designating device 7 at the time of the skip speed change is made, the lever 7a is moved from the upper position to the lower position as follows:

Position D→Position 4, or Position 3, or Position 2 or Position 1

Position 4→Position 3, or Position 2, or Position 1,
Position 3→Position 2 or Position 1,
Position 2→Position 1.

Thus, when the lever 7a is moved from position D to position 4 for example, it means that F5 is designated as a speed stage to be preselected. The lever operation executed at step 105 shows the lever operation under this state. When the judgment executed at step 105 shows that the lever 7a has been operated, at step 106, a judgment is made as to whether or not the present speed stage is larger than the sum of the preselected speed stage designated by step 105 and 1:

Assume now that the present speed stage is F7 and the speed stage designated by step 105 is F6, then the skip speed change would not occur. However, when the speed stage designated by step 105 is F5, a skip speed change jumping beyond state F6 would be resulted. In the former case, the result of judgment at step 106 becomes NO, whereas in the latter case the result of judgment becomes YES.

As can be clearly noted from the foregoing description, at step 106, a judgment is made as to whether the speed change from the present speed stage to the speed stage instructed by step 105 corresponds to a skip speed change or not.

When the result of judgment at step 106 is YES, at the next step 107, preselection of a speed stage is executed. As a consequence, the speed stage instructed at step 106 is noted by the controller 13 as a preselected speed stage.

After that, at step 108, a judgment similar to that of step 104 is executed, and when the result of this judgment is YES, at step 109, a judgment is made as to whether the lever 7a of the speed change range designating device 7 has been operated to a neutral position or not. When the result of this judgment is NO, at step 110, a judgment is made as to whether the lock-up clutch 6 shown in FIG. 1 has been OFF for an interval longer than a predetermined interval, in other words, whether the operating time of the torque converter 3 has exceeded a predetermined interval or not.

When the result of judgment at step 110 is YES, at step 112, a judgment is made as to whether the lever 7a of the speed change range designating device 7 has been operated to position D or not. When the result of judgment is NO, at step 113, a judgment is made as to whether the present car speed represented by the output of the rotation sensor 9 is less than a car speed commensurate with the speed stage preselected at step 107 or not.

More particularly, when the result of judgment at step 112 is YES, or when the result of judgment at step 109 is YES, it is considered that the operator does not wish to perform a skip speed change.

As is well known in the art, there are commensurate speeds or speed ranges for respective speed stages of the transmission mechanism 1. The memory device of the controller 13 prestores optimum car speeds for respective speed stages, so that at step 113, the optimum car speed of the preselected speed stage is read out of the memory device for executing the desired judgment.

Where the result of judgment at step 113 is NO, it is not desirable to effect a skip speed change to the preselected speed stage. Consequently, in such a case, at step 114, the present speed stage, for example, F7 is held and at step 115, a skip waiting flag is set. Therefore, the program is returned to step 101.

As the skip waiting flag is set at step 115, the result of judgment at step 101 becomes YES so that the program is jumped to step 108. So long as the results of judgments at step 108, 109, 110, 111, 112 and 113 are YES, NO, NO, YES, NO and NO respectively, the set state of the flag would be continued.

As the car speed decreases below a speed commensulate with the preselected speed stage and as the result of judgment at step 113 becomes YES, at step 116, an instruction signal instructing a speed stage preselected at step 107 is supplied to the solenoid valve 2 of the transmission mechanism 1 from the controller 13, whereby the preselected speed stage would be selected by the transmission mechanism 1. Consequently, when the present speed stage is F7 and the preselected speed stage is F2, for example, the speed would be directly shifted down from F7 to F2.

Upon completion of the shift-down to the preselected speed stage, at step 117, the skip waiting flag is cleared. Therefore, the program of the controller 13 is returned to step 101. At this time, the result of judgment of step 101 becomes NO, so that the program starting from step 102 is executed again.

The fact that either one of the results of judgments at steps 102-106 is NO means that a condition for preselecting a speed stage is not satisfactory so that in such case the normal automatic speed change processing described above would be executed at step 108.

At step 108, when it is judged that the car speed sensor is abnormal, that is when the car speed sensor 9 becomes abnormal after a speed stage has been preselected at step 107 or after the skip waiting flag has been set at step 115, the program of the controller 13 would be jumped to step 117.

Furthermore, when the result of judgment at step 109 is YES, at step 118, the transmission device 1 is brought to the neutral position and then the program is jumped to step 117.

Furthermore, when the results of judgments at steps 110, 111 and 112 are YES, NO and YES respectively, at step 119 after the optimum speed stage commensurate with the present car speed has been selected, the program is jumped to step 117.

The contents of steps 107 - 112 present conditions for releasing the preselection of the car speed stage.

As above described, according to this embodiment, immediately before or after the car reaches a slope, an optimum speed stage is preselected so that the car speed reaches a magnitude commensurate with a preselected speed stage. Consequently, the preselected speed stage would be automatically selected. Thus, when a car running at a speed stage of F7, for example, reaches a slope, so long as the preselected speed stage is designated to a speed stage of lower than F5, the speed would be shifted-down directly to the preselected speed stage from F7 when the car speed reaches a speed commensurate with the preselected speed stage.

Although in this embodiment, the speed change range instruction device 7 was also used as means for preselecting a speed stage, an independent speed stage selecting means, for example, a rotary switch or a lever switch can be used.

What is claimed is:

1. An electronically controlled automatic speed changing apparatus comprising:

means for generating a speed stage change signal in accordance with a degree of throttle opening, engine speed and a predetermined speed change pattern;

actuator means for actuating a transmission in accordance with said speed stage change signal so as to change the speed stage of said transmission;

speed stage preselecting means for preselecting a desired speed stage of said transmission for a skipped speed stage change;

car speed detecting means for detecting car speed;

memory means for storing car speeds suitable for each speed stage of said transmission;

comparing means for comparing a current car speed detected by said car speed detecting means with the car speeds suitable for the desired speed stage; and means for generating a skip speed stage change signal to instruct said actuator means to actuate said transmission so that the speed stage is skip-changed into said desired speed stage when said current car speed becomes less than the car speeds suitable for the desired speed stage.

2. The apparatus of claim 1 wherein said speed stage preselecting means comprises:

speed stage designating means for designating said desired speed stage;

preselection judging means for judging as to whether the preselection of the desired speed stage designated by said speed stage designating means may be executed or not; and means for inhibiting the execution of the preselection if said preselection judging means judges the preselection should not be executed.

3. The apparatus of claim 2 wherein said speed stage designating means utilizes a speed change range designating device for designating speed change ranges.

4. The apparatus of claim 2 wherein said preselection judging means performs judgment based on whether or not said desired speed stage is lower than said current speed stage by two stages or more.

5. The apparatus of claim 2 wherein said preselection judging means performs judgment based on whether or not a throttle pedal is actuated.

6. The apparatus of claim 2 wherein said preselection judging means performs judgment based on whether or not a retarder brake is in off position.

* * * * *